United States Patent
Wu et al.

(10) Patent No.: US 7,145,459 B2
(45) Date of Patent: Dec. 5, 2006

(54) SYSTEMS AND METHODS FOR MANUFACTURING CONTROL USING RADIO FREQUENCY IDENTIFICATION

(75) Inventors: Hong-Yi Wu, Hsinchu (TW); James You, Hsinchu (TW); Hong-Wen Liao, Banqiao (TW)

(73) Assignee: Taiwan Semiconductor Manufacturing Co,M Ltd., Hsinchu (TW)

( * ) Notice: Subject to any disclaimer, the term of this patent is extended or adjusted under 35 U.S.C. 154(b) by 209 days.

(21) Appl. No.: 11/030,854

(22) Filed: Jan. 7, 2005

(65) Prior Publication Data

US 2006/0167571 A1    Jul. 27, 2006

(51) Int. Cl.
*G08B 13/18* (2006.01)
*H04Q 5/22* (2006.01)

(52) U.S. Cl. .................. 340/572.1; 340/10.1; 700/225

(58) Field of Classification Search ............. 340/572.1, 340/572.4, 572.8, 10.1, 10.4, 10.42; 700/225, 700/83; 235/375
See application file for complete search history.

(56) References Cited

U.S. PATENT DOCUMENTS

| | | | | |
|---|---|---|---|---|
| 4,805,089 A | * | 2/1989 | Lane et al. | 700/83 |
| 4,843,538 A | * | 6/1989 | Lane et al. | 700/83 |
| 5,256,204 A | * | 10/1993 | Wu | 118/719 |
| 5,372,471 A | * | 12/1994 | Wu | 414/806 |
| 2004/0020040 A1 | * | 2/2004 | Arneson et al. | 29/825 |

* cited by examiner

*Primary Examiner*—Toan N. Pham
(74) *Attorney, Agent, or Firm*—Thomas, Kayden, Horstemeyer & Risley

(57) ABSTRACT

A system for manufacturing control using radio frequency identification (RFID). A trigger issues a trigger signal when activated by user contact. A RFID interrogator retrieves information from a RFID tag when activated. A controller is configured to activate the RFID interrogator, get the relative information from associated systems and control the indicator according to the trigger signal. An indicator provides operating status of the RFID interrogator and/or information getting from the controller.

18 Claims, 2 Drawing Sheets

SYSTEMS AND METHODS FOR MANUFACTURING CONTROL USING RADIO FREQUENCY IDENTIFICATION

BACKGROUND

The invention relates to product manufacturing, and more particularly to systems and methods for manufacturing control using radio frequency identification.

In a conventional semiconductor manufacturing environment, a wafer lot is assigned a lot identification number (lot ID), and processing tools execute processes accordingly. In open cassette environment without SMIF (Standard Mechanical InterFace) mechanisms, the lot ID is typically identified visually and input manually by an operator. When an erroneous lot ID is input, the wafer lot may be processed improperly, requiring reprocessing or scrapping.

Currently barcodes are used for identifying lot IDs of wafer lots in such environment for cost issue. In this case, an operator uses a hand-held scanner to read the barcodes. Although this method is an improvement over purely manual processes, it can be difficult for complete implementation, partly due to the need for close proximity and proper alignment between the scanner and barcodes. It also requires an operator to participate in the load-identification process. The operator may need to exit the transport vehicle to scan the barcodes manually, slowing down process operations. Certain locations, such as high loading docks, are particularly problematic for implementing barcodes due to the need for close proximity between the barcode tags and the reader. As a result, loads in those areas are often visually identified instead. After the barcode tag is scanned manually, the corresponding wafer carrier is put into a loading port of a processing tool by the operator. Because the barcode scanning and lot loading is executed separately by the operator, it is possible for the operator to scan barcode of one carrier and load another. In this case, the loaded wafer lot is processed according to a recipe corresponding to the scanned barcode.

Radio-frequency identification ("RFID") tag systems have been used in inventory tracking, wherein RFID tags are attached to an object or location. A RFID tag comprises a non-volatile memory storing information identifying the object or location and electronic circuitry interacting with a RFID interrogator, detecting the presence of a RFID tag and reading the identification information therefrom. A RFID interrogator typically comprises an RF transceiver transmitting interrogation signals to RFID tags and receiving response signals therefrom, one or more antennae connected to the transceiver, and associated decoders and encoders reading and writing encoded information in the received and transmitted RF signals, respectively.

In a semiconductor manufacturing environment with SMIF mechanisms, the RFID interrogator is typically equipped with optical sensor, and activated when the optical sensor detects an item. The RFID technique has drawbacks when applied in the environment without SMIF mechanisms. The RFID interrogator retrieves information stored in a RFID tag when the tag is in proximity. When the information, such as lot ID, is retrieved by a RFID interrogator associated with a processing tool, an automatic transport device may be activated to load a corresponding wafer lot onto the processing tool. The RFID interrogator is activated when a wafer carrier passes by, and a transport device activated thereby may be hazardous to an operator.

SUMMARY

Embodiments of the invention provide systems for manufacturing control using radio frequency identification (RFID), comprising a trigger, a RFID interrogator, an indicator, and a controller. The trigger issues a trigger signal when activated by user contact. The RFID interrogator retrieves information from a RFID tag when activated. The indicator provides operating status from the RFID interrogator and other systems. The controller activates the RFID interrogator, gets the relative information from associated systems by using the data of RFID tag and controls the indicator according to the trigger signal.

Also disclosed is a method of manufacturing control using radio frequency identification (RFID). A product associated with a RFID tag is provided. A trigger is activated by user contact and a trigger signal is issued therefrom. Information stored in the RFID tag is retrieved in response to the trigger signal. By using the information, the operating status of the RFID interrogator and relative information are provided.

DESCRIPTION OF THE DRAWINGS

The invention can be more fully understood by reading the subsequent detailed description and examples with references made to the accompanying drawings, wherein.

DETAILED DESCRIPTION

Embodiments of the invention are now described with reference to FIGS. 1 and 2, which generally relate to a manufacturing system using radio frequency identification (RFID). While semiconductor manufacturing is used here for descriptive purposes, it is understood that the product processed by the manufacturing system is not critical, and other manufacturing system using open cassettes to carry work-in-process may be readily substituted.

In the following detailed description, reference is made to the accompanying drawings which form a part hereof, and in which is shown by way of illustration of specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense, and the scope of the present invention is only defined by the appended claims. The leading digit(s) of reference numbers appearing in the Figures corresponds to the Figure number, with the exception that the same reference number is used throughout to refer to an identical component which appears in multiple Figures.

Figure 1:
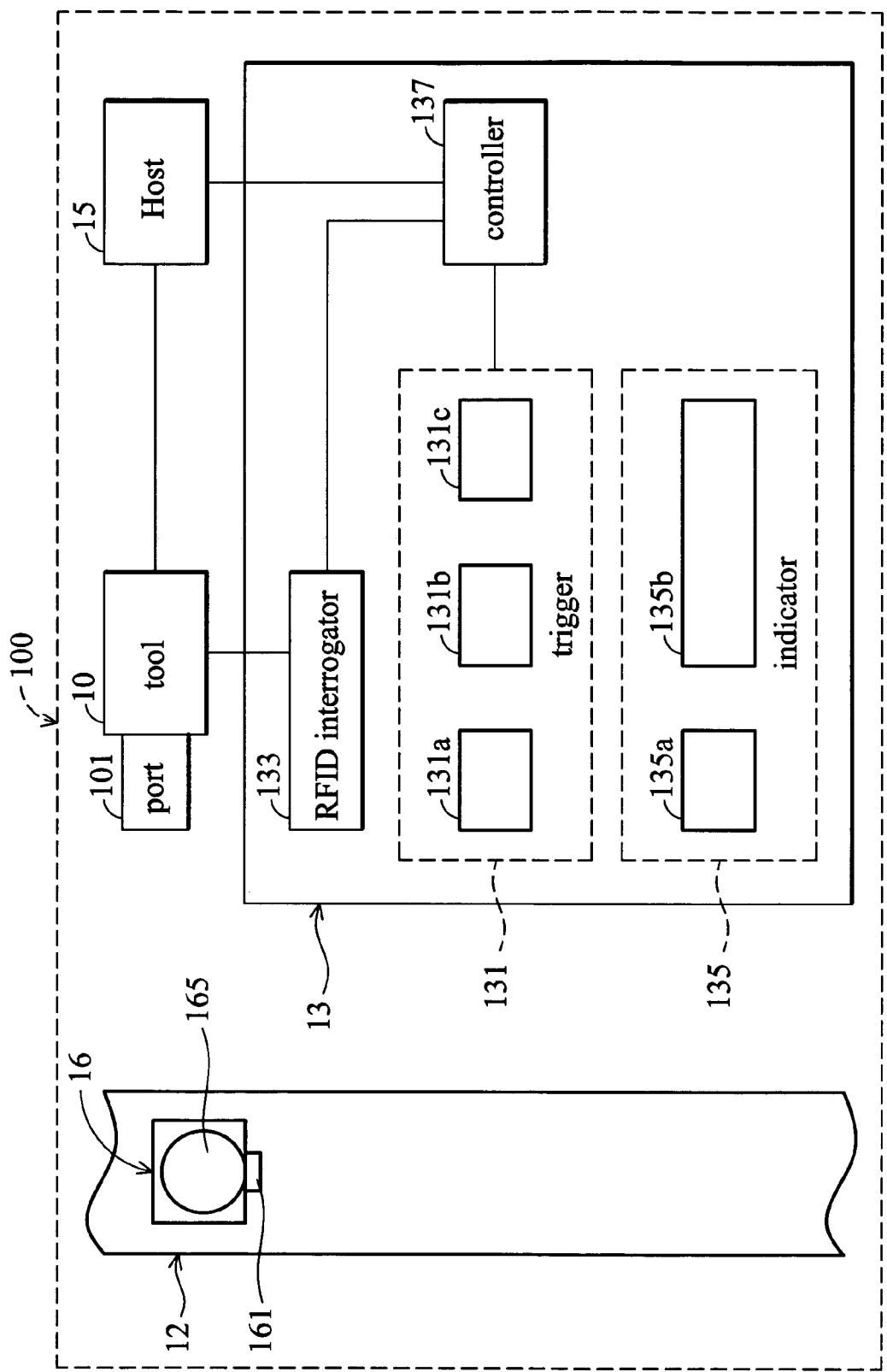
FIG. 1 is a schematic view of a manufacturing system according to embodiments of the invention.

FIG. 1 is a schematic view of a manufacturing system according to embodiments of the invention, specifically a semiconductor manufacturing system 100 comprising a tool 10, a RFID reader 13, a host 15, and a transport device 12. Tool 10 comprises port 101 for loading product into and removing processed product from tool 10. The RFID reader 13 comprises trigger 131, RFID interrogator 133, indicator 135, and controller 137. Trigger 131 comprises a button, touch panel, or other control activated by user contact.

Trigger 131 initiates a specific action, issuing a corresponding signal when activated by user contact. For example, trigger 131 comprises button 131a triggering product loading via port 101, button 131b triggering product output via port 101, and a button 131c triggering information retrieval by RFID interrogator 133. Indicator 135 indicates operating status of port 101 and/or other information getting from relative systems by controller 137. Indicator 135 comprises indicator lamp 135a, display panel 135b, and other types of indicator capable of indicating various information from controller 137. For example, indicator lamp 135a emits light of different blinking patterns, and/or different colors to indicate operating status of the port 101 and/or the RFID interrogator 133 corresponding to the trigger signal. Display panel 135b shows various information from controller 137 through textual and/or graphical information. Controller 137 activates the RFID interrogator 133 and controls indicator 135 according to the trigger signal transmitted from trigger 131. When a wafer lot 165 is to be processed by tool 10, an operator will put carrier 16 loaded with wafer lot 165 on port 101, wherein the carrier 16 is an open cassette and then presses button 131a to trigger information retrieval by RFID interrogator 133. RFID interrogator 133 retrieves information stored in a RFID tag 161 attached to carrier 16. The information stored in RFID tag 161 comprises product identification information, such as lot ID, product ID, and other pertinent information. The information retrieved from RFID tag 161 is transmitted to controller 137, and sent to host 15. Host 15 receives the information, performs required "check-in" processes for wafer lot 165, and then issues an operating command to tool 10 to direct operation thereof accordingly. Host 15 can also issues an operating signal to controller 137. Controller 137 receives the operating signal and activates controller indicator 135 to show operating status of tool 10. When tool 10 completes processes on wafer lot 165, another operating signal is generated and sent to host 15 and then transmitted to controller 137, and indicator 135 is activated to show operating status of tool 10. Therefore, the operator can get the operating status of tool 10 from indicator 135. In addition, an operator can press button 131c to get the relative information of the wafer lot from indicator 135 before, during or after processing. For example, before processing, an operator presses the button 131c, controller 137 triggers tag information retrieval by RFID interrogator 133 and then sent to host 15. Host 15 performs defined query function and replies to controller 137 and then show the result on indicator 135. Thus, the operator can check the status of the wafer lot according the result just nearby the port 101 before processing.

Figure 2:
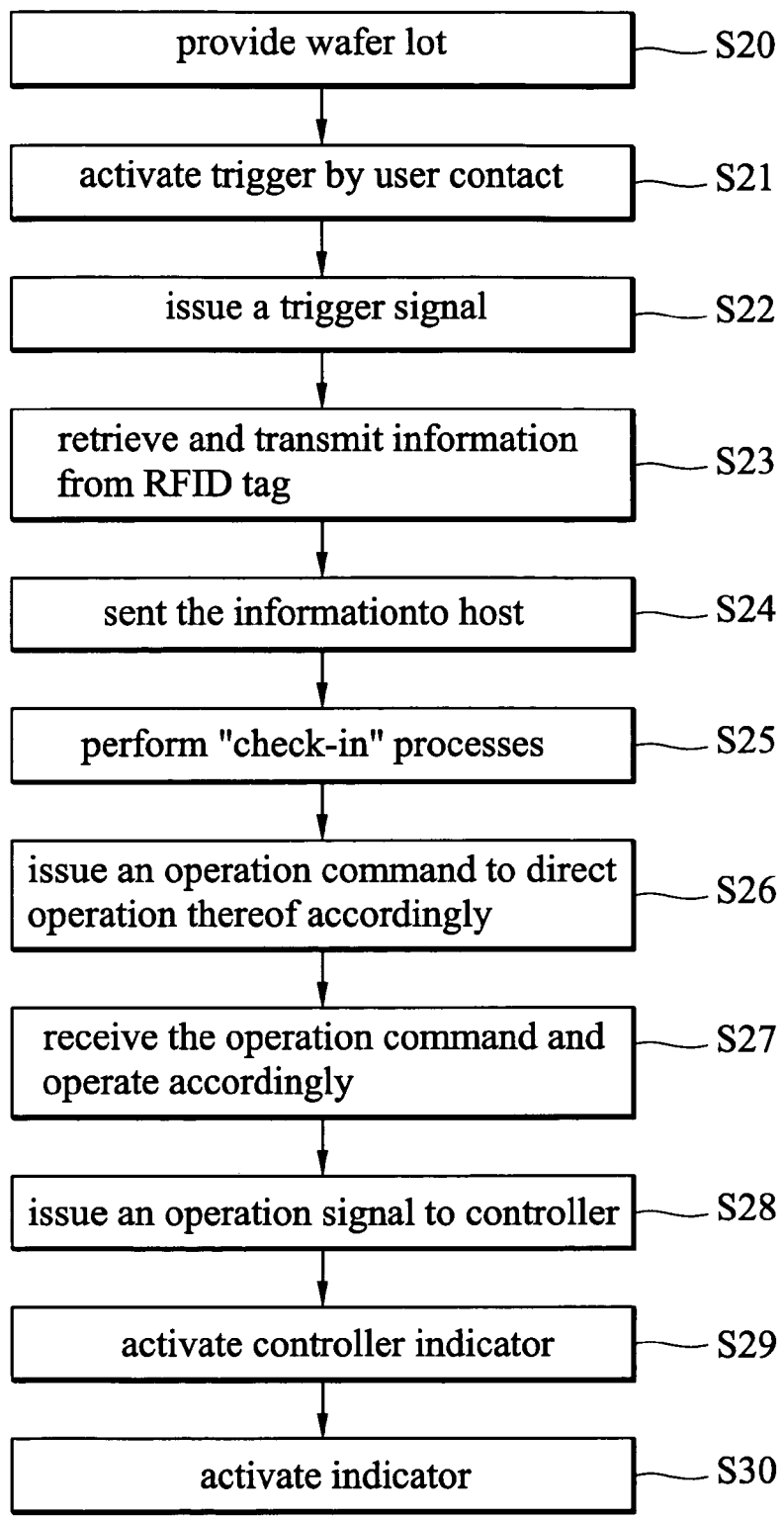
FIG. 2 is a flowchart of a method according to embodiments of the invention.

FIG. 2 is a flowchart of a method according to embodiments of the invention. The method shown in FIG. 2 may be implemented in system 100.

Wafer lot 165 to be processed by tool 10 is provided, loaded into carrier 16 associated with RFID tag 161 (step S20). Wafer lot 165 is put on port 101 by operator.

Trigger 131, such as button 131a, is activated by user contact (step S21). A trigger signal is issued and transmitted to controller 137 (step S22). The controller 137 receives the trigger signal, and directs RFID interrogator 133 to retrieve information stored in RFID tag 161. The information stored in RFID tag 161 comprises product identification information corresponding to wafer lot 165, such as lot ID, product ID, and other pertinent information.

The information retrieved from RFID tag 161 is transmitted to controller 137 (step S23), and sent to host 15 (step S24). Host 15 receives the information, performs required "check-in", "check-out" or "information-query" processes for wafer lot 165 (step S25), and then host 15 issues an operating command to tool 10 to direct operation thereof accordingly (step S26) or reply the query result to controller 137 and show on indicator 135. In "check-in" case tool 10 receives the operating command, operates accordingly (step S27), and then host 15 issues an operating signal to controller 137 (step S28). Controller 137 receives the operating signal and activates controller indicator 135 to show operating status of tool 10 (step S29). When tool 10 completes processes on wafer lot 165, another operating signal is transmitted to controller 137 from host 15, and causes indicator 135 to show operating status of tool 10 (step S30). Then an operator can press button 131b to perform "check-out" function.

While the invention has been described by way of example and in terms of preferred embodiment, it is to be understood that the invention is not limited thereto. To the contrary, it is intended to cover various modifications and similar arrangements (as would be apparent to those skilled in the art) Therefore, the scope of the appended claims should be accorded the broadest interpretation so as to encompass all such modifications and similar arrangements.

What is claimed is:

1. A system for manufacturing control using radio frequency identification (RFID), comprising:
a trigger issuing a trigger signal when activated by user contact;
a RFID interrogator retrieving information from a RFID tag when activated;
a controller configured to activate the RFID interrogator and control an indicator according to the trigger signal; and
an indicator providing operating status of the RFID interrogator and/or information getting from the controller.

2. The system of claim 1, further comprising a tool processing a product associated with the RFID tag, wherein the tool is equipped with a port for product input and/or output.

3. The system of claim 2, wherein the product is a semiconductor product.

4. The system of claim 2, further comprising a host connected to the controller, and directing operation of the tool corresponding to the information retrieved from the controller.

5. The system of claim 2, wherein the indicator provides operating status of the tool and/or the port and/or the up-to-date information of the product.

6. The system of claim 1, wherein the information retrieved from the RFID tag comprises product identification information.

7. The system of claim 1, wherein the trigger comprises a button.

8. The system of claim 1, wherein the trigger comprises a touch panel.

9. The system of claim 1, wherein the indicator comprises an indicator lamp.

10. The system of claim 1, wherein the indicator comprises a liquid crystal display.

11. A method of performing radio frequency identification (RFID), comprising:
providing a product associated with a RFID tag;
activation of a trigger by user contact and issuance of a trigger signal thereof;
retrieving information from the RFID tag in response to the trigger signal; and
providing operating status of the RFID interrogator and/or the up-to-date information of the product.

12. The method of claim 11, further comprising providing a semiconductor product associated with the RFID tag.

13. The method of claim 11, further transmitting the information retrieved from the RFID tag to a host, wherein the host directs processing of the product corresponding to the information.

14. The method of claim 11, further comprising retrieving product identification information corresponding to the product from the RFID tag.

15. The method of claim 11, further comprising activation of a button by user contact to generate the trigger signal.

16. The method of claim 11, further comprising activation of a touch panel by user contact to generate the trigger signal.

17. The method of claim 11, further comprising provision of processing status of the product by an indicator lamp.

18. The method of claim 11, further comprising provision of processing status of the product by a liquid crystal display.

* * * * *